United States Patent
Tao et al.

(10) Patent No.: US 10,337,637 B2
(45) Date of Patent: Jul. 2, 2019

(54) CIRCUIT CONTROLLER FOR ELECTROMAGNETIC VALVE

(71) Applicant: NINGBO HOYEA INDUSTRIAL CONTROL TECHNOLOGY CO., LTD., Ningbo, Zhejiang (CN)

(72) Inventors: Guoliang Tao, Ningbo (CN); Feifei Chen, Ningbo (CN); Ce Zhang, Ningbo (CN); Zhidan Weng, Ningbo (CN)

(73) Assignee: NINGBO HOYEA MACHINERY MANUFACTURE CO., LTD., Ningbo, Zhejiang (CN)

( * ) Notice: Subject to any disclaimer, the term of this patent is extended or adjusted under 35 U.S.C. 154(b) by 347 days.

(21) Appl. No.: 15/104,965

(22) PCT Filed: Dec. 17, 2014

(86) PCT No.: PCT/CN2014/094087
§ 371 (c)(1),
(2) Date: Jun. 15, 2016

(87) PCT Pub. No.: WO2015/090202
PCT Pub. Date: Jun. 25, 2015

(65) Prior Publication Data
US 2016/0319953 A1  Nov. 3, 2016

(30) Foreign Application Priority Data

Dec. 17, 2013  (CN) .......................... 2013 1 0696101

(51) Int. Cl.
*F16K 31/06* (2006.01)
*H01F 7/06* (2006.01)
(Continued)

(52) U.S. Cl.
CPC ...... *F16K 31/0675* (2013.01); *F16K 31/0613* (2013.01); *F16K 31/0679* (2013.01);
(Continued)

(58) Field of Classification Search
CPC .......... F02M 2025/0845; F02M 59/466; F16K 31/0613; F16K 31/0675; F16K 31/0679;
(Continued)

(56) References Cited

U.S. PATENT DOCUMENTS

| 8,508,905 | B2 * | 8/2013 | Baek .................... | H01H 47/325 |
| | | | | 361/139 |
| 2009/0015980 | A1 * | 1/2009 | Fukano .............. | F16K 31/0675 |
| | | | | 361/194 |
| 2011/0214741 | A1 * | 9/2011 | Fukano ................. | H01F 7/1805 |
| | | | | 137/1 |

FOREIGN PATENT DOCUMENTS

| CN | 201170321 Y | * | 12/2008 |
| JP | 3777265 B2 | * | 5/2006 |

* cited by examiner

*Primary Examiner* — Thienvu V Tran
*Assistant Examiner* — Nicolas Bellido
(74) *Attorney, Agent, or Firm* — Raymond Y. Chan; David and Raymond Patent Firm

(57) ABSTRACT

An electromagnetic valve includes a valve body, a valve core, and an electromagnetic drive device. The valve body has an operation chamber, wherein the valve core is movably arranged in the operation chamber. The electromagnetic drive device is arranged in the valve core and is suitable for being electrically connected with a power source. The electromagnetic drive device is arranged, when driving the electromagnetic valve, to provide the valve core with a starting drive so as to drive the valve core to enter a running state. After the valve core is driven to enter the running to state, to provide the valve core with a maintaining drive so as to keep the valve core in the running state.

5 Claims, 11 Drawing Sheets

(51) Int. Cl.
*H01F 7/08* (2006.01)
*H01F 7/18* (2006.01)

(52) U.S. Cl.
CPC ............. *H01F 7/064* (2013.01); *H01F 7/081* (2013.01); *H01F 7/1805* (2013.01); *H01F 7/1844* (2013.01); *H01F 2007/1866* (2013.01)

(58) Field of Classification Search
CPC .. H01F 2007/1866; H01F 7/064; H01F 7/081; H01F 7/1805; H01F 7/1844
See application file for complete search history.

(A1) Adjust the voltage provided to the electromagnetic valve based on the preset voltage in order to improve the stability of the voltage.

(A) When the electromagnetic valve is turned on, a turn-on current is generated from an electromagnetic driving device of the electromagnetic valve to a magnetic field generating unit.

(B) After receiving a voltage switching signal, a holding current is generated from an electromagnetic driving device of the electromagnetic valve to a magnetic field generating unit, wherein an amount of the turn-on current is larger than that of the holding current.

(C) Detect the holding current provided to the circuit controller of the electromagnetic driving device, and the amount of the holding current is compared with a preset current valve, and if the amount of the holding current matches with that of the preset current, the amount of the holding current is remained the same; if the amount of the holding current is different than that of the preset current, the circuit controller of the electromagnetic driving device adjusts the amount of the holding current.

FIG. 9

CIRCUIT CONTROLLER FOR ELECTROMAGNETIC VALVE

CROSS REFERENCE OF RELATED APPLICATION

This is a non-provisional application that claims priority to international application number PCT/CN2014/094087, international filing date Dec. 17, 2014, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an electromagnetic valve, and more particular to an electromagnetic valve with an electromagnetic driving device. The present invention further provides to a method for supplying electrical power for the electromagnetic valve.

Description of Related Arts

Electromagnetic valve is an industrial equipment of the electromagnetic control and is an automatic basic component for fluid control. The electromagnetic valve generally comprises a sealed chamber, oil holes formed at different positions of the sealed chamber, a piston disposed at a middle of the sealed chamber, and two electromagnets disposed on two sides of the piston respectively. Each of the electromagnets generally comprises an armature and an electromagnet coil, wherein movements of a valve body can be controlled by the displacement of armature which is controlled by the amount of the current passing through/cutting off the control coil. Then, the oil holes can be opened or closed by the movements of the armature, so a hydraulic cylinder can be pushed to move by the oil pressure.

Accordingly, the existing electromagnetic valve provides a simple structure between the coil and the armature to provide a large hydraulic power, on the other hand, the coil generates a large amount of heat.

Electromagnetic valve is a mechanical equipment which can be commonly used to control the flow direction, the flow rate or other parameters. Electrical power is required for the electromagnetic valve, and the control of the fluid can be achieved by controlling/cutting off the amount of the current of the control coil of the electromagnetic valve.

Conventional electromagnetic valve has several drawbacks. At first, the common industrial electromagnetic valve has a large power consumption based on the structure thereof, wherein the existing operating voltage of the electromagnetic valve is kept in constant during the entire operating period to determine the high-energy consumptions for electromagnetic valve. Secondly, when the power of the electromagnetic valve is turned on, the control coil of the electromagnetic valve will generate a lot of heat after a long continuous usage period of the existing electromagnetic valve. As the temperature of the control coil being increased, and the resistance thereof is increased and the current is decreased. Again, the reliability is poor during the start of the electromagnetic valve, and the valve core of the electromagnetic valve is easy to be stuck and can't be started by the power of the fluid, burrs, and particles. Also, an alternating current is used by the electromagnetic valve, and an output of the alternating current easily to generate fluctuations. In addition, if the displacement of the valve core of the electromagnetic valve is not in position, the inductance of the control coil becomes smaller and the current passed through the control coil become larger, so that the current passed through the control coil control exceeds the maximum standard to cause the control coil being burned. Finally, the loss of the vortex of the electromagnetic valve is large so as to cause a low working efficiency.

SUMMARY OF THE PRESENT INVENTION

The invention is advantageous in that it provides an electromagnetic valve, wherein the present invention doesn't need to modify an original structure of the electromagnetic valve, and has low power-consuming and low heat-generating ability.

Another advantage of the invention is to provide an electromagnetic valve with low power-consuming, wherein the electromagnetic valve comprises a valve body, a valve core disposed within the valve body, at least one pusher disposed on one side of the valve core, at least one spring disposed around the pusher, at least one electromagnet arranged on an outer side of the pusher, and two oil inlets and two oil outlets arranged on a bottom surface of the valve body to communicate with the valve core. The electromagnet comprises a core tube, a core tube coil arranged around an outer periphery of the core tube, a yoke that embraces the core coil, and a wiring assembly adapted for supplying the current to the core coil. The yoke is arranged inside the core tube, and the valve core is pushed by the yoke and the pusher. A circuit control module is arranged between the wiring assembly and the core coil. The circuit control module comprises an input module, a step-down module, a delayed switching module, and an output module. An initial voltage is transmitted from the input module by the wiring assembly, and the initial voltage can be directly transmitted to the delayed switching module or be transmitted to the step-down module first, and then transmitted to the delayed switching module later to generate a step-down voltage. After the initial voltage and the step-down voltage are received by the delayed switching module, an output voltage value is exported to the output module to drive a start of the electromagnet to generate an output voltage. After the electromagnet is started, the output voltage is switched to a step-down voltage by delaying a preset time.

Furthermore, the circuit control module further comprises a step-down current detection module and an inrush current suppression module. The step-down current detection module and the delayed switching module are connected with each other, so as to detect the step-down voltage value of the step-down voltage, and then the step-down voltage value is passed through the inrush current suppression module to be fed back to step-down module. The step-down voltage value is analyzed by the step-down module in order to determine the step-down voltage imported to the delayed switching module is matched with the requirement or not. The inrush current suppression module is mainly used to prevent the step-down voltage exported from the step-down current detection module being mutated due to various causes, and then a malfunction is generated by the step-down module.

Furthermore, the circuit control module further comprises a rectifier circuit arranged between the input module and the step-down module.

Furthermore, the circuit control module further comprises an over-heating protection module, an anti-oscillation circuit module, and a short circuit protection module. The over-heating protection module and the step-down module are two-way connected, so as to prevent the overheating for the step-down module. The anti-oscillation module is arranged between the delayed switching module and the output module, so as to prevent the fluctuations of the voltage generated from the delayed switching module. The short circuit protection module is connected to the step-down current detection module 5 to prevent short circuits.

Furthermore, the step-down module, the step-down current detection module, the inrush current suppression module, the over-heating protection module, the anti-oscillation circuit protection module and the short circuit protection module are integrated to form a XL2009 chip and a peripheral circuit. The peripheral circuit comprises an inductor L1, MOS tube Q1, capacitor C1, capacitor C2, capacitor C3, capacitor C4, diode D1, diode D2, diode D3, resistor R1, resistor R2, resistor R3, and resistors R4. One end of the inductor L1 is connected to a fifth port, a sixth port, and a reverse side of the diode D2, and the other end of the inductor L1 is connected to a second end of the capacitor C3, a reverse end of the diode D3, the output buck voltage respectively. A forward end of the diode D2 is connected to a second end of the capacitor C3, and a forward end of the diode D3 respectively. The initial voltage is connected to a the fourth port of the XL2009 chip, the capacitor C2, and a first port of the capacitor C4. A second port of the capacitor C4 is connected to a third port of the XL2009. One end of the resistor R2 is connected to a fourth port of the XL2009, and the other end of the resistor R2 is connected to a first port of the capacitor C1, a first port of the resistor R3, a reverse end of the diode D1, and a grid electrode of the MOS tube Q1. A forward port of the diode D1, a second port of the resistor R3, a second port of the capacitor C1, and a source electrode of the MOS tube Q1 are grounded. A drain electrode of the MOS tube Q1 is connected to a second port of the capacitor C2. A second port of the XL2009 chip is connected with the initial voltage through the resistor R1. A step-down voltage is generated from a first port of the MOS tube Q1 through the resistor R4.

Furthermore, the amount of the turn-on voltage is 24V, and the amount of the step-down voltage is 8V, the amount of the LI inductor is 40-50 uH, the amount of the capacitor C1 is 0.5-2 uF, the amount of the capacitor C2 is 70-120 uF, the amount of the capacitor C3 is 70-100 uF, the amount of the capacitor C4 is 0.5-1 uF, the amount of the resistor R1 is 15-16.5K ohms, the amount of the resistor R2 is 40-50K ohms, the amount of the resistor R3 is 19-19.5 ohms, and the amount of the resistor R4 is 40-50K ohms.

The electromagnetic valve of the present invention comprises a circuit control module arranged between the valve coil and the wiring assembly, wherein the circuit control module is able to provide a large voltage to turn on the electromagnetic valve, and after the electromagnetic valve is turned on, a lower voltage is provided to the electromagnetic valve, so as reduce the power consumption and the heat generation.

The main advantage of the present invention is to provide an electromagnetic valve, the electromagnetic driving device is adapted to generate a driving force to force the valve core being moved, and to generate a holding force to maintain the vale core in the operating state, wherein the amount of the driving force is larger than that of the holding force.

Another advantage of the present invention is to provide an electromagnetic valve, where the electromagnetic valve has low power consumption during the entire operation.

Another advantage of the present invention is to provide an electromagnetic valve, wherein the electromagnetic valve has a higher reliability during turn-on and closed situation.

Another advantage of the present invention is to provide an electromagnetic valve, wherein the magnetic coil of the electromagnetic valve is relatively safe and not easy to be burned.

Another advantage of the present invention to provide an electromagnetic valve, wherein the power supply of the electromagnetic valve is relatively stable.

Another advantage of the present invention is to provide an electromagnetic valve, wherein the electromagnetic valve has a lower eddy current loss, so as to save more electricity.

Another advantage of the present invention is to provide an electromagnetic valve, wherein the electromagnetic coil has a small heat-generation, and after a prolonged use, the standard temperature can be remained.

Another advantage of the present invention to is to provide an electromagnetic valve, wherein the electromagnetic valve can be converted from the conventional electromagnetic valve. In other words, the electromagnetic valve can be achieved by slightly modifying the electromagnetic valve of the current invention, and the electromagnetic valve will not reduce the reliability of existing electromagnetic valve and increase the energy-consumption.

Another advantage of the present invention is to provide an electromagnetic valve, wherein the electromagnetic valve has small in size, low in cost, easy to install and easy to use.

Another advantage of the present invention is to provide an electromagnetic valve, wherein the circuit controller of the electromagnetic driving device of the electromagnetic valve comprises a current detection module and an inrush current suppression module adapted to detect the voltage provided to the electromagnetic valve from the electromagnetic driving device, so as to ensure the voltage magnitude provided by the electromagnetic driving device and keeping the stability of the voltage provided by the electromagnetic driving device.

Another advantage of the present invention is to provide an electromagnetic valve wherein the control circuit of the electromagnetic driving device comprises a rectifier module to enhance the stability of the electromagnetic driving device.

Another advantage of the present invention is to provide a method for supplying an electrical power to the electromagnetic valve, wherein a turn-on current is provided to the electromagnetic valve while the electromagnetic valve is turned on. After the electromagnetic valve is turned on, a holding current is provided to the electromagnetic valve, wherein the amount of the turn-on current is larger than that of the holding current.

Another advantage of the present invention is to provide an electromagnetic driving device of the electromagnetic valve, wherein while the electromagnetic valve is turned on, a driving force is provided by the electromagnetic driving device to force the valve core being moved, and after the electromagnetic valve is turned on, a holding force is provided by the electromagnetic driving device to the electromagnetic valve, so as to maintain the vale core in the operating state, wherein the amount of the driving force is larger than that of the holding force.

Another advantage of the present invention is to provide an electromagnetic driving device used by an electromagnetic valve, wherein the electromagnetic valve having the electromagnetic driving device has low power consumption during the entire operation.

Another advantage of the present invention is to provide an electromagnetic driving device used by an electromagnetic valve, wherein the electromagnetic valve has a higher reliability during a turn-on and closed situation.

Another advantage of the present invention is to provide an electromagnetic driving device used by an electromagnetic valve, wherein the magnetic coil of the electromagnetic valve is relatively safe and not easy to be burned.

Another advantage of the present invention to provide an electromagnetic driving device used by an electromagnetic valve, wherein the power supply of the electromagnetic valve is relatively stable.

Another advantage of the present invention is to an electromagnetic driving device used by an electromagnetic valve, wherein the electromagnetic valve has a lower eddy current loss, so as to save more electricity.

Another advantage of the present invention is to provide an electromagnetic driving device used by an electromagnetic valve, wherein the electromagnetic coil has a small heat-generation, and after a prolonged use, the standard temperature can be remained.

Another advantage of the present invention to is to provide an electromagnetic driving device used by an electromagnetic valve, wherein the electromagnetic driving device is used with the electromagnetic valve together. In other words, the electromagnetic driving device can be used with the electromagnetic valve without modifying the structure of the electromagnetic valve, and the electromagnetic valve will not reduce the reliability of existing electromagnetic valve and increase the energy-consumption.

Another advantage of the present invention is to provide an electromagnetic driving device used by an electromagnetic valve, wherein the electromagnetic valve has small in size, low in cost, easy to install and easy to use.

Another advantage of the present invention is to provide an electromagnetic driving device used by an electromagnetic valve, wherein the circuit controller of the electromagnetic driving device of the electromagnetic valve comprises a current detection module and an inrush current suppression module adapted to detect the voltage provided to the electromagnetic valve from the electromagnetic driving device, so as to ensure the voltage magnitude provided by the electromagnetic driving device and keeping the stability of the voltage provided by the electromagnetic driving device.

Another advantage of the present invention is to provide an electromagnetic driving device used by an electromagnetic valve, wherein the control circuit of the electromagnetic driving device comprises a rectifier module to enhance the stability of the electromagnetic driving device.

Another advantage of the present invention is to provide a method for supplying an electrical power to the electromagnetic valve, wherein a turn-on current is provided to the electromagnetic valve while the electromagnetic valve is turned on. After the electromagnetic valve is turned on, a holding current is provided to the electromagnetic valve, wherein the amount of the turn-on current is larger than that of the holding current.

Another advantage of the present invention is to provide an electromagnetic driving device of the electromagnetic valve, wherein while the electromagnetic valve is turned on, a driving force is provided by the electromagnetic driving device to force the valve core being moved, and after the electromagnetic valve is turned on, a holding force is provided by the electromagnetic driving device to the electromagnetic valve, so as to maintain the vale core in the operating state, wherein the amount of the driving force is larger than that of the holding force.

Another advantage of the present invention is to provide an electromagnetic valve, where the electromagnetic valve has low power consumption during the entire operation.

Another advantage of the present invention is to provide an electromagnetic valve, wherein the electromagnetic valve has a higher reliability during turn-on and closed situation.

Another advantage of the present invention is to provide an electromagnetic valve, wherein the magnetic coil of the electromagnetic valve is relatively safe and not easy to be burned.

Another advantage of the present invention to provide an electromagnetic valve, wherein the power supply of the electromagnetic valve is relatively stable.

Another advantage of the present invention is to provide an electromagnetic valve, wherein the electromagnetic valve has a lower eddy current loss, so as to save more electricity.

Another advantage of the present invention is to provide an electromagnetic valve, wherein the electromagnetic coil has a small heat-generation, and after a prolonged use, the standard temperature can be remained.

Another advantage of the present invention to is to provide an electromagnetic valve, wherein the electromagnetic valve can be converted from the conventional electromagnetic valve. In other words, the electromagnetic valve can be achieved by slightly modifying the electromagnetic valve of the current invention, and the electromagnetic valve will not reduce the reliability of existing electromagnetic valve and increase the energy-consumption.

Another advantage of the present invention is to provide an electromagnetic valve, wherein the electromagnetic valve has small in size, low in cost, easy to install and easy to use.

Another advantage of the present invention is to provide an electromagnetic valve, wherein the circuit controller of the electromagnetic driving device of the electromagnetic valve comprises a current detection module and an inrush current suppression module adapted to detect the voltage provided to the electromagnetic valve from the electromagnetic driving device, so as to ensure the voltage magnitude provided by the electromagnetic driving device and keeping the stability of the voltage provided by the electromagnetic driving device.

Another advantage of the present invention is to provide an electromagnetic valve wherein the control circuit of the electromagnetic driving device comprises a rectifier module to enhance the stability of the electromagnetic driving device.

Another advantage of the present invention is to provide a method for supplying an electrical power to the electromagnetic valve, wherein a turn-on current is provided to the electromagnetic valve while the electromagnetic valve is turned on. After the electromagnetic valve is turned on, a holding current is provided to the electromagnetic valve, wherein the amount of the turn-on current is larger than that of the holding current.

Another advantage of the present invention is to provide an electromagnetic driving device of the electromagnetic valve, wherein while the electromagnetic valve is turned on, a driving force is provided by the electromagnetic driving device to force the valve core being moved, and after the electromagnetic valve is turned on, a holding force is provided by the electromagnetic driving device to the electromagnetic valve, so as to maintain the vale core in the operating state, wherein the amount of the driving force is larger than that of the holding force.

Another advantage of the present invention is to provide a circuit controller used by an electromagnetic valve, wherein the electromagnetic valve having the electromagnetic driving device has low power consumption during the entire operation.

Another advantage of the present invention is to provide a circuit controller used by an electromagnetic driving device used by an electromagnetic valve, wherein the electromagnetic valve has a higher reliability during turn-on and closed situation.

Another advantage of the present invention is to provide a circuit controller used by an electromagnetic driving device used by an electromagnetic valve, wherein the magnetic coil of the electromagnetic valve is relatively safe and not easy to be burned.

Another advantage of the present invention to provide a circuit controller used by an electromagnetic driving device used by an electromagnetic valve, wherein the power supply of the electromagnetic valve is relatively stable.

Another advantage of the present invention is to provide a circuit controller used by an electromagnetic driving device used by an electromagnetic valve, wherein the electromagnetic valve has a lower eddy current loss, so as to save more electricity.

Another advantage of the present invention is to provide a circuit controller used by an electromagnetic driving device used by an electromagnetic valve, wherein the electromagnetic coil has a small heat-generation, and after a prolonged use, the standard temperature can be remained.

Another advantage of the present invention to is to provide a circuit controller used by an electromagnetic driving device used by an electromagnetic valve, wherein the electromagnetic driving device is used with the electromagnetic valve together. In other words, the electromagnetic driving device can be used with the electromagnetic valve without modifying the structure of the electromagnetic valve, and the electromagnetic valve will not reduce the reliability of existing electromagnetic valve and increase the energy-consumption.

Another advantage of the present invention is to provide a circuit controller used by an electromagnetic driving device used by an electromagnetic valve, wherein the electromagnetic valve has small in size, low in cost, easy to install and easy to use.

Another advantage of the present invention is to provide a circuit controller used by an electromagnetic driving device used by an electromagnetic valve, wherein the circuit controller of the electromagnetic driving device of the electromagnetic valve comprises a current detection module and an inrush current suppression module adapted to detect the voltage provided to the electromagnetic valve from the electromagnetic driving device, so as to ensure the voltage magnitude provided by the electromagnetic driving device and keeping the stability of the voltage provided by the electromagnetic driving device.

Another advantage of the present invention is to provide a circuit controller used by an electromagnetic driving device used by an electromagnetic valve, wherein the control circuit of the electromagnetic driving device comprises a rectifier module to enhance the stability of the electromagnetic driving device.

Another advantage of the present invention is to provide a method for supplying an electrical power to the electromagnetic valve, wherein a turn-on current is provided to the electromagnetic valve while the electromagnetic valve is turned on. After the electromagnetic valve is turned on, a holding current is provided to the electromagnetic valve, wherein the amount of the turn-on current is larger than that of the holding current.

According to the present invention, the foregoing and other objects and advantages are attained by an electromagnetic valve comprising:

a valve body, which is formed with an operation chamber;

a valve core movably disposed within the operation chamber; and an electromagnetic driving device disposed in the valve core, wherein the electromagnetic driving device is electrically connected with a power source, wherein when the electromagnetic valve is turned on, a turn-on current can be generated to force the valve core in an operating state; a holding current is generated after the electromagnetic valve is turned on, and then valve core is retained in the operating state by the electromagnetic driving device.

According to the present invention, the foregoing and other objects and advantages are attained by an circuit controller, wherein the circuit controller is electrically connected with a power source, wherein when the electromagnetic valve is turned on, a turn-on current can be generated to force the valve core in an operating state; a holding current is generated after the electromagnetic valve is turned on, and then valve core is retained in the operating state, wherein the amount of the turn-on current is larger than that of the holding current.

In accordance with another aspect of the invention, the present invention comprises a method for providing electrical power to an electromagnetic valve, comprising the following steps.

(A) When the electromagnetic valve is turned on, a turn-on current is generated from an electromagnetic driving device of the electromagnetic valve to a magnetic field generating unit.

(B) After receiving a voltage switching signal, a holding current is generated from an electromagnetic driving device of the electromagnetic valve to a magnetic field generating unit, wherein an amount of the turn-on current is larger than that of the holding current.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives features, and advantages of the present invention will become apparent from the following detailed description, the accompanying drawings, and the appended claims.

BRIEF DESCRIPTION OF THE DRAWINGS

FIG. 9 is a flow chart of a method for supplying electrical power to the electromagnetic valve according to the above mentioned preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
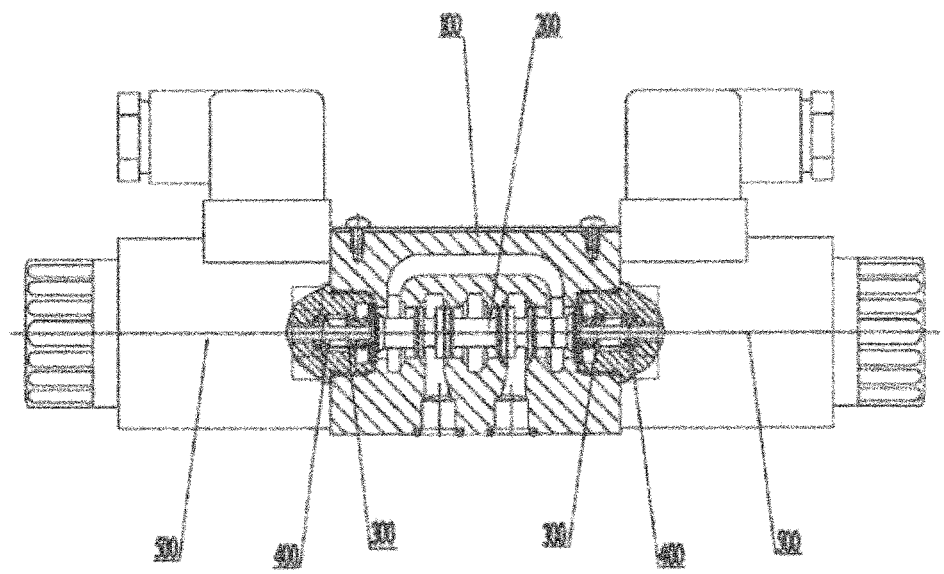
FIG. 1 is a sectional view of an electromagnetic vale with low power-consumption according to a first preferred embodiment of the present invention.
Figure 2:
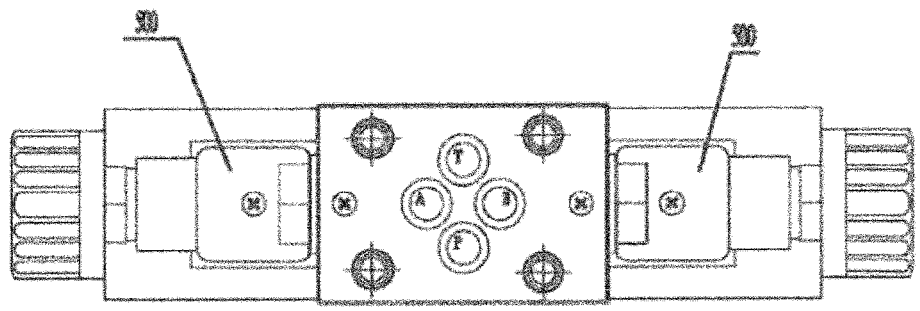
FIG. 2 is a top view of the electromagnetic valve with low-power consumption according to the above mentioned preferred embodiment of the present invention.
Figure 3:
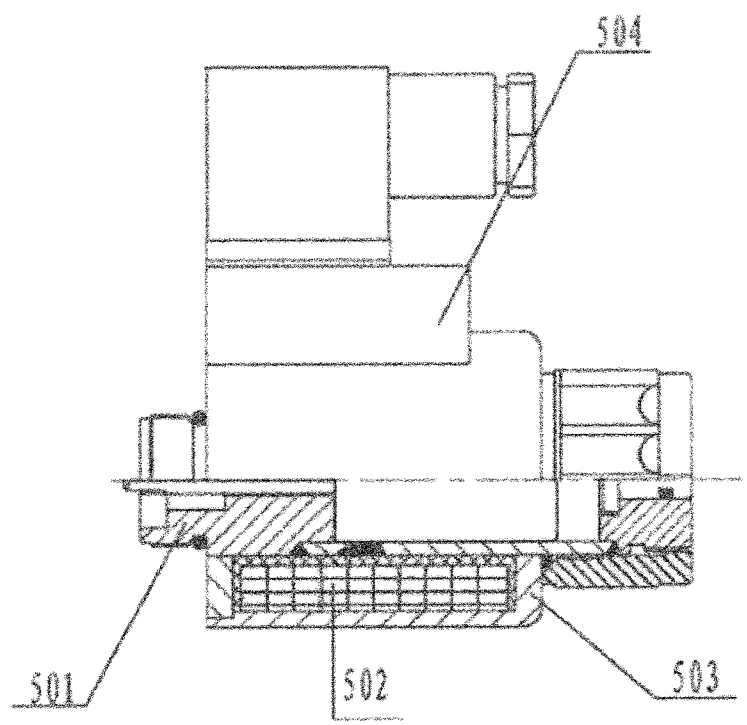
FIG. 3 is a sectional view of the electromagnet valve shown in FIG. 2 according to the above mentioned preferred embodiment of the present invention.

Referring to FIGS. 1 to 3 of the drawings, an electromagnetic valve according to a first preferred embodiment of the present invention is illustrated, wherein the electromagnetic valve comprises a valve body 100, a valve core 200 disposed within the valve body 100, two pushers 300 disposed on two sides of the valve core 200 respectively, at least one spring 400 encircled around each of the pushers 300, at least one electromagnet 500 arranged on an outer side of the pusher 300, two oil inlets (A, B) and two oil outlets (P, T) arranged on a bottom surface of the valve body 100 and communicating with the valve core 200.

The valve body 100 is able to be moved by the electromagnets 500 so as to switch the oil passage between the oil inlets (A, B) and the oil outlets (P, T).

The electromagnet 500 comprises a core tube 501, a core tube coil 502 arranged around an outer periphery of the core tube 501, a yoke 503 arranged to embrace the core coil 502, and a wiring assembly 504 for supplying the current to the core coil 502. The yoke 503 is arranged inside the core tube 501 (not shown in the Figures), and the valve core 200 is pushed by the yoke 503 and the pushers 300. A circuit control module (not shown in the Figures) is arranged between the wiring assembly 504 and the core coil 502.

The external current is connected to the wiring assembly 504 through the circuit control module to the core coil 502. After the current is transmitted to the core coil 502, a magnetic field is generated to force a movement of the yoke 503 inside the core tube 501, so as to drive a movement of the pusher 300. The yoke 503 prevents the leakage of the magnetic field generated by the core coil 502.

Figure 4:
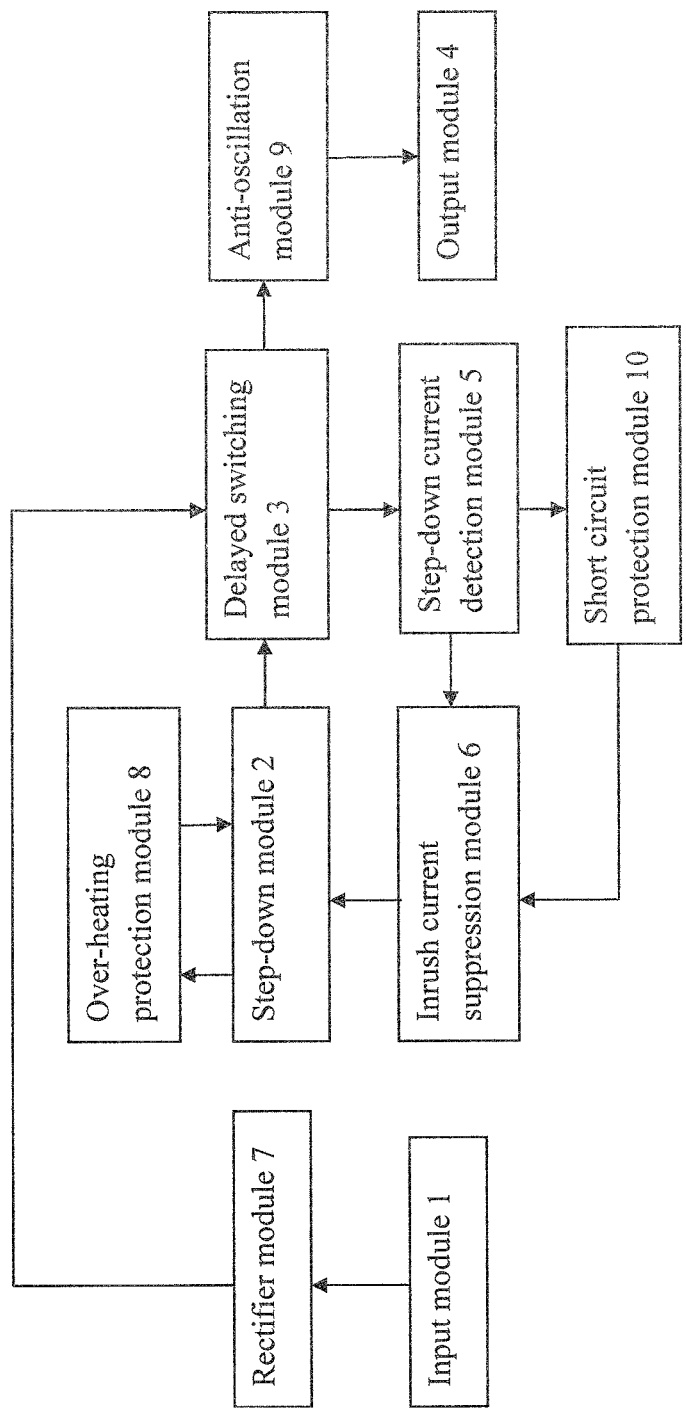
FIG. 4 is a block diagram of a circuit control module shown in FIG. 3 according to the above mentioned preferred embodiment of the present invention.

Referring to FIG. 4 of the drawings, the circuit control module comprises an input module 1, a step-down module 2, a delayed switching module 3, and an output module 4. An initial voltage is transmitted from the input module 1 by the wiring assembly, and the initial voltage can be directly transmitted to the delayed switching module 3 or be transmitted to the step-down module 2 first, and then transmitted to the delayed switching module 3 later to generate a step-down voltage. After the initial voltage and the step-down voltage are received by the delayed switching module 3, an output voltage value is exported to the output module 4 to initialize of the electromagnet 500 to generate an output voltage. After the electromagnet is started, the output voltage is switched to a step-down voltage by delaying a preset time.

A huge amount of force is required to start the electromagnet 500, and at the same time, a huge amount of voltage is needed for the core coil 502 of the electromagnet 500 to generate a large amount of magnetic force to active a ram effect. However, when the electromagnet 500 is turned on, only a smaller amount of force is required to maintain the start situation for the electromagnet. If a high voltage is still flowing through the core coil 502, the loss of the power is increased, and at the same time, a large amount of heat is generated from the core coil 502.

The circuit control module is provided before the core coil 502 is turned on, so that a high voltage is provided to turn on the core coil 502, and then the high voltage is transferred to a low voltage by the circuit control module so as to reduce the loss of the power and reduce the heat generated from the core coil 502.

In order to stabilize the step-down voltage and the output voltage, the circuit control module further comprises a step-down current detection module 5 and an inrush current suppression module 6; the step-down current detection module 5 and the delayed switching module 3 is connected with each other, so as to detect the step-down voltage value of the step-down voltage, and then the step-down voltage value is passed through the inrush current suppression module 6 to be fed back to step-down module 2. The step-down voltage value is analyzed by the step-down module 2 in order to determine the step-down voltage imported to the delayed switching module 3 is matched with the requirement or not.

The inrush current suppression module 6 is mainly used to prevent the step-down voltage exported from the step-down current detection module 5 being mutated due to various changes which causes a malfunction by the step-down module 2. The voltage of the core coil 502 is changed due to the malfunction of the step-down module 2, so that the control of the electromagnet is unstable. Therefore, the step-down current detection module 5 and the inrush current suppression module 6 are very important for the circuit control module of the electromagnet.

Preferably, the circuit control module further comprises a rectifier module 7, wherein the initial voltage is transmitted to the rectifier module 7 before transmitting to the input module 1, the step-down module 2 and a delayed switching module 3 in order to further enhance the stability of the circuit. The rectifier module 7 can be used as a variety of sophisticated rectification programs, such as full-bridge rectifier and the like.

Preferably, the circuit control module further comprises an over-heating protection module 8, an anti-oscillation circuit module 9, and a short circuit protection module 10. The over-heating protection module 8 and the step-down module 2 are two-way connected, so as to prevent the overheating for the step-down module 2. The anti-oscillation module 9 is arranged between the delayed switching module 3 and the output module 4, so as to prevent the fluctuations of the voltage generated from the delayed switching module 3. The short circuit protection module 10 is connected to the step-down current detection module 5 to prevent short circuits.

The rectifier 7, the step-down current detection module 5, the inrush current suppression module 6, the over-heating protection module 8, the anti-oscillation module 9 and the short-circuit protection circuit module 10 are applied in the circuit control module of the present invention in order to ensure the stability of voltage and the safety of the circuit, and the circuit control module can be directly applied to real electromagnets.

Furthermore, the step-down module 2, the step-down current detection module 5, the inrush current suppression module 6, the over-heating protection module 8, the anti-oscillation circuit protection module 9 and the short circuit protection module 10 are integrated to form a XL2009 chip and a peripheral circuit.

The XL2009 core chip is a high-performance converter DC-DC chip provided from Shanghai Dragon semiconductor technology Co., Ltd. The existing XL2009 chip is designed for using in the in-car charging developed chip, which is mainly used in car chargers. According to the present invention, the XL2009 chip can be creatively applied to the circuit control module in the electromagnets as a major step-down module, and to enable the XL2009 chip being more suitable for using in the electromagnets. In addition, the peripheral circuit of the XL2009 chip is specifically designed.

Figure 5:
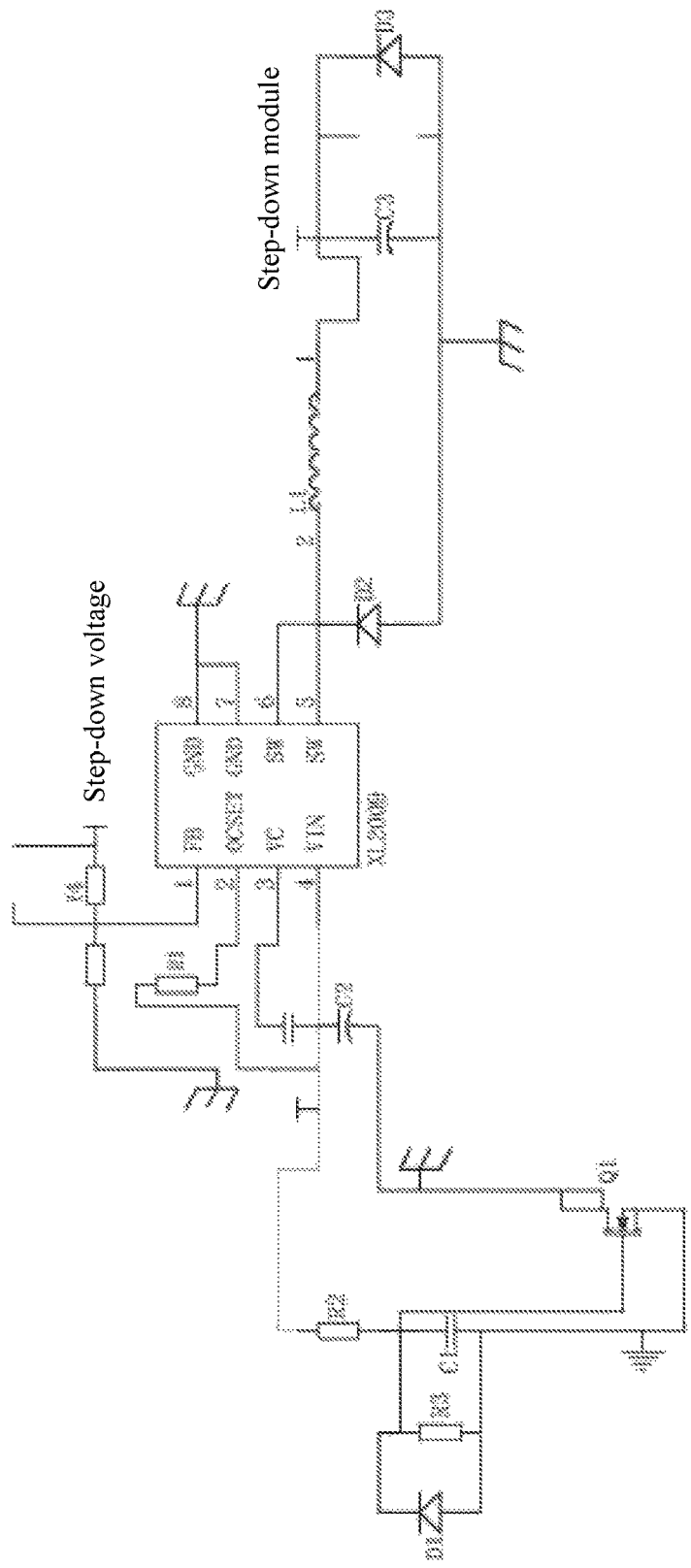
FIG. 5 is a circuit diagram of a XL2009 chip and a peripheral circuit shown in FIG. 4 according to the above mentioned preferred embodiment of the present invention.

In particularly, referring to FIG. 5 of the drawings, the peripheral circuit comprises an inductor L1, MOS tube Q1, capacitor C1, capacitor C2, capacitor C3, capacitor C4, diode D1, diode D2, diode D3, resistor R1, resistor R2, resistor R3, and resistors R4. One end of the inductor L1 is connected to a fifth port, a sixth port, and a reverse side of the diode D2, and the other end of the inductor L1 is connected to a second end of the capacitor C3, a reverse end of the diode D3, the output buck voltage respectively. A forward end of the diode D2 is connected to a second end of the capacitor C3, and a forward end of the diode D3 respectively. The initial voltage is connected to a the fourth port of the XL2009 chip, the capacitor C2, and a first port of the capacitor C4. A second port of the capacitor C4 is connected to a third port of the XL2009. One end of the resistor R2 is connected to a fourth port of the XL2009, and the other end of the resistor R2 is connected to a first port of the capacitor C1, a first port of the resistor R3, a reverse end of the diode D1, and a grid electrode of the MOS tube Q1. A forward port of the diode D1, a second port of the resistor R3, a second port of the capacitor C1, and a source electrode of the MOS tube Q1 are grounded. A drain electrode of the MOS tube Q1 is connected to a second port of the capacitor C2. A second port of the XL2009 chip is connected with the initial voltage through the resistor R1. A step-down voltage is generated from a first port of the MOS tube Q1 through the resistor R4.

Referring to FIG. 5 of the drawings, the buck current sensing circuit is formed by the inductor L1. The inrush current limit circuit is formed by the MOS tube Q1 and peripheral circuits of the inrush current limit circuit, and the over-temperature protection circuit, the short circuit protection circuit and the anti-oscillation circuit are formed by an internal modules of the XL2009, all kinds of peripheral resistance, capacitors, and diodes.

The XL2009 chip, which is originally used in car charger, is creatively used in electromagnets and is used with the peripheral circuit, so that the XL2009 chip is an important part in the circuit control module of the electromagnet: the buck module doesn't have an own design circuit, and only the peripheral circuit needs to be designed to save the cost of the development.

Furthermore, a turn-on voltage of the existing conventional electromagnets is 24V, and a turn-on voltage of a regular electromagnet is 24V. After rigorous calculation and experiments, the voltage of the regular electromagnet remains 8V, and the step-down voltage is generated by the step-down module to maintain the voltage at 8V. That is to say, the stability of the voltage remains at 8V. As shown in FIG. 2, the amount of the electronic components in the peripheral circuit of the XL2009 chip are: the amount of the LI inductor is 40-50 uH, the amount of the capacitor C1 is 0.5-2 uF, the amount of the capacitor C2 is 70-120 uF, the amount of the capacitor C3 is 70-100 uF, the amount of the capacitor C4 is 0.5-1 uF, the amount of the resistor R1 is 15-16.5K ohms, the amount of the resistor R2 is 40-50K ohms, the amount of the resistor R3 is 19-19.5 ohms, and the amount of the resistor R4 is 40-50K ohms.

According to the above mention values of the electronic components, the step-down voltage passed through of the step-down module is very stable, which can be conformed for the high stability requirements of the use of electromagnets.

A conventional delay circuit and a switching circuit can be applied to the delayed switching module 3, and the main working principle is that: the initial voltage and step-down voltage are inputted into the delayed switching module 3 respectively. In other words, the initial voltage is passed through the delayed switching module 3, and then the step-down voltage is passed therethrough. A regular delayed circuit and a RC delayed circuit can be applied to the delayed switching module 3. A circuit consisted of multiple interlocked contactors or a switching circuit controlled by the control chip through the software algorithm can be applied to the switching circuit of the present invention.

Referring to FIGS. 6A to 9 of the drawings, an electromagnetic valve according to a second embodiment of the present invention illustrates an alternative mode of the first embodiment, wherein the electromagnetic valve comprises a valve body 10, a valve core 20 and at least one electromagnetic driving device 30, wherein the valve body 10 is formed with an operation chamber 100. The valve core 20 can be movably disposed within the operation chamber 100 of the valve body 10, and the electromagnetic driving devices 30 are disposed in the operation chamber 100 of the valve body 10, wherein each of the electromagnetic driving devices 30 comprises a magnetic field generating unit 31, a passive member 32 and a circuit controller 33. The magnetic field generating unit 31 is formed with a drive chamber 310, wherein the driving chamber 310 is communicated with the operation chamber 100, and the passive member 32 can be movably disposed within the driving chamber 310. The passive driven member 32 and the valve core 20 are physically connected, so that the appropriate current can be generated by the magnetic field generating unit 31 of the electromagnetic driving devices 30. The valve core 20 can be activated to be moved inside the operation chamber 100 by the passive member 32 which is activated by the electromagnetic driving device 30, so that the valve core 20 is in an operating state.

Preferably, the circuit controller 33 of the electromagnetic driving device 30 is electrically connected with the magnetic field generating unit 31 and a power source respectively, wherein when the electromagnetic valve is turned on, a turn-on current can be generated from the magnetic field generating unit 31 to force the passive member 32 moving inside the driving chamber 310, and then the valve core 20 can be activated in the operating state. A remaining current generated by the circuit controller 33 is provided to the magnetic field generating unit 31 after the electromagnetic valve is turned on, so the passive 32 can be maintained for moving inside the driving chamber 310. That is to say, the electromagnetic driving devices are electrically connected to the power source, wherein the valve core 20 can be activated in the operating state by the electromagnetic driving device 30 while the electromagnetic valve is turned on. After that, the valve core 20 also can be retained in the operating state by the electromagnetic driving device 30.

It is worth to mention that a turn-on current, such as 24V, is generated from the circuit controller 33 to the electromagnetic driving device 30 while the electromagnetic valve is turned on, and then the passive member 32 is activated for moving inside the driving chamber 310, and then the valve core 20 can be activated in the operating state. A remaining voltage, such as 8V, is generated by the circuit controller 33 and provided to the magnetic field generating unit 31 to maintain the operating state of the electromagnetic valve, Accordingly, the electromagnetic valve of the present invention can be remained under a normally operating state with less-power consuming.

Preferably, the passive member 32 is made of magnetic and rigid material, and after the appropriate current is provided to the electromagnetic driving device 30 is provided after an appropriate current, a magnetic field is generated by the magnetic field generating unit 31, wherein the magnetic field is passed through the driving chamber 310, and the passive member 32 can be activate to be moving inside the driving chamber 310 by the magnetic field.

It is worth to mention that the passive member 32 not only can be made of rigid and magnetic material, but also can be made of soft and magnetic material. The soft and magnetic material of the present invention has a coercive force which is not greater than 1000 A/m. Preferably, the passive member 32 is made of soft iron, silicon or silicon steel and other soft and magnetic materials. The passive member 32 also can may be replaced to other soft and magnetic material, such as carbonyl iron material.

Alternatively, the driving chamber 310 is formed by the valve body 10 of the electromagnetic valve. When the appropriate current is provided to the electromagnetic driving device 30, the magnetic field generated by the magnetic field generating unit 31 of the electromagnetic driving device 30 is passed through the driving chamber 310, and then the driving member 32 is moved within the driving chamber 310 by the magnetic field.

Alternatively, the driving chamber 310 is disposed in the operation chamber 100 of the valve body 10 of the electromagnetic valve.

Figure 6A:
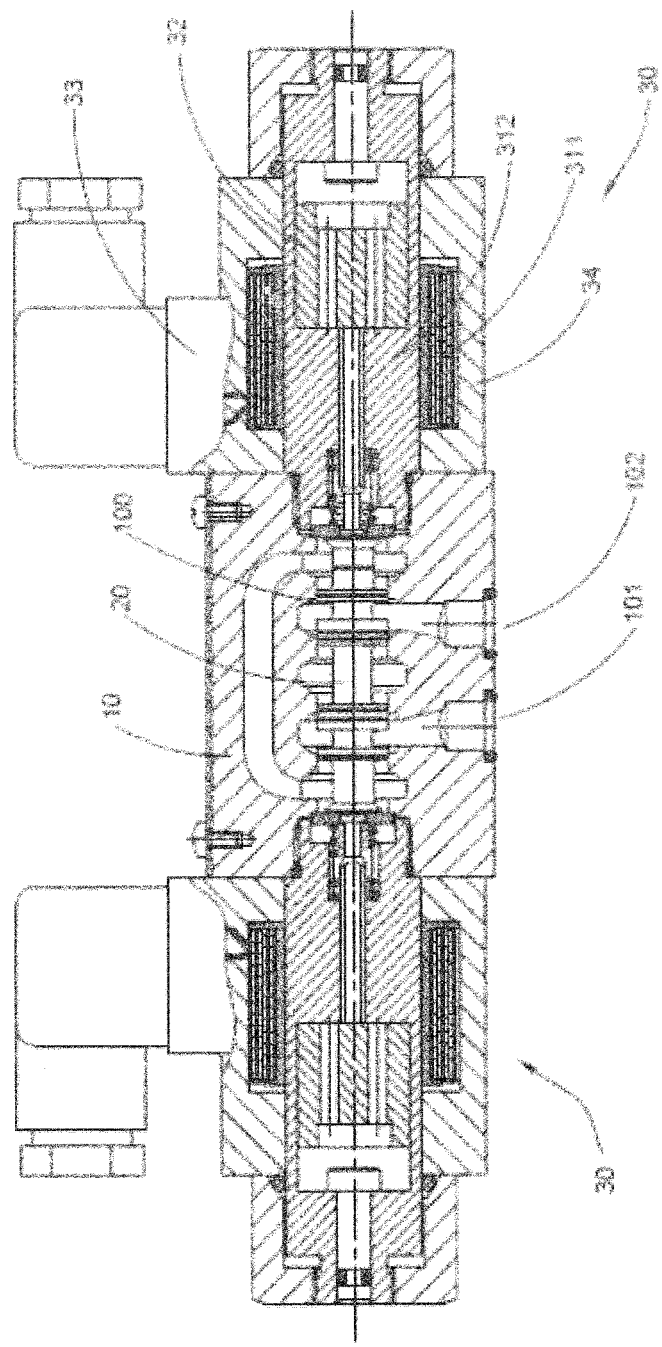
FIG. 6A is a perspective view of an electromagnetic valve according to a second preferred embodiment of the present invention.
Figure 6B:
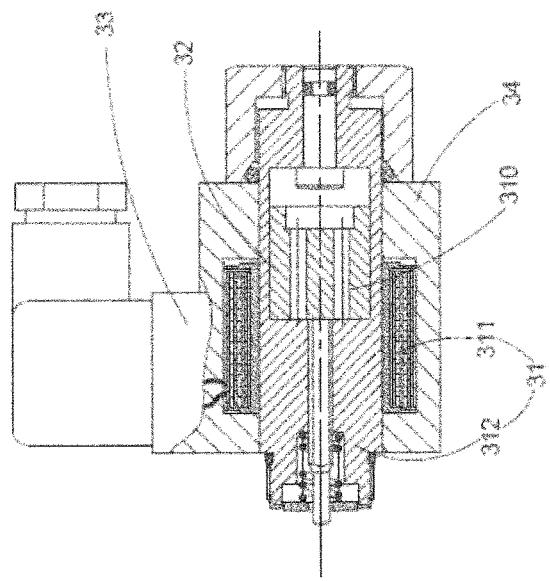
FIG. 6B is a sectional view of the electromagnetic valve according to the above mentioned second preferred embodiment of the present invention, illustrating an electromagnetic driving device of the electromagnetic valve.

As shown in FIG. 6A and FIG. 6B, the magnetic field generating unit 31 of the electromagnetic valve comprises an electromagnetic coil 311 and a magnetic sensor 312, wherein the electromagnetic coil 311 is wound around the magnetic sensor 312, and the magnetic sensor 312 is in the driving chamber 310. The electromagnetic coil 311 and the circuit controller 33 are electrically connected, wherein the magnetic sensor 312 and the passive member 32 are made of soft magnetic materials. When the turn-on current flows in the electromagnetic coil 311, the vale core 20 can be activated to operate in the operating state by the electromagnetic driving device 30, and a holding current flows in the electromagnetic coil 311 to maintain the valve core 20 being operating in the operating state. In other words, when the turn-on current is provided by the circuit controller 33 of the electromagnetic driving device 30 to the electromagnetic coil 311 of the electromagnetic field generating unit 311, a magnetic field generated by the magnetic field generating unit 31 of the electromagnetic driving device 30 can be passed through the driving chamber 310, and then the passive member 32 can be activated to move in the driving chamber 310 by the magnetic field, wherein the valve core can be activated for moving by the passive member. When a holding current is provided by the circuit controller of the electromagnetic driving device 30 to the electromagnetic coil 311, a magnetic field is generated by the magnetic field generating unit 31 of the electromagnetic driving device 30 can be passed through the driving chamber 310, and the passive member 32 can be maintained in the operating state, and the valve core 20 can be maintained in the operating state. It is worth to mention that since the passive member 32 is made of a soft and magnetic material, and a magnetic field passed through the driving chamber 310 can be generated by the magnetic field generating unit 31 while the turn-on current and the holding current is provided on the magnetic field generating unit 31. When the turn-on current or the holding current can be generated through the drive chamber 310 of the magnetic field, thus preferably, the passive member 32 can be moved by an electromagnetic force.

It is worth to mention that the magnetic sensor 312 not only can be made of rigid and magnetic material, but also can be made of soft and magnetic material. The soft and magnetic material of the present invention has a coercive force which is not greater than 1000 A/m. Preferably, the magnetic sensor 312 is mace of soft iron, silicon or silicon steel and other soft and magnetic materials. The magnetic sensor 312 also can may be replaced to other soft and magnetic material, such as carbonyl iron material.

Referring to FIG. 6A and FIG. 6B of the drawings, the valve body 10 of the electromagnetic valve comprises at least one fluid inlet 101 and at least one fluid outlet 102, wherein when the valve core 20 moves within the operation chamber 100 of the valve body 10, the valve core 20 is connected with the fluid inlet 101 and the fluid outlet respectively, so that the valve core 20 can be activated for moving by the electromagnetic driving device 30, and the valve core 20 can be selectively connected with the fluid inlet 101 and the fluid outlet 102.

Referring to FIG. 6B of the drawings, the electromagnetic driving device 30 of the electromagnetic valve further comprises a yoke 34, wherein the yoke 34 is covered on the magnetic field generating unit 31 of the electromagnetic drive device 30 to reduce the leakage of the magnetic field generated by the magnetic field generating unit 31.

Figure 7:
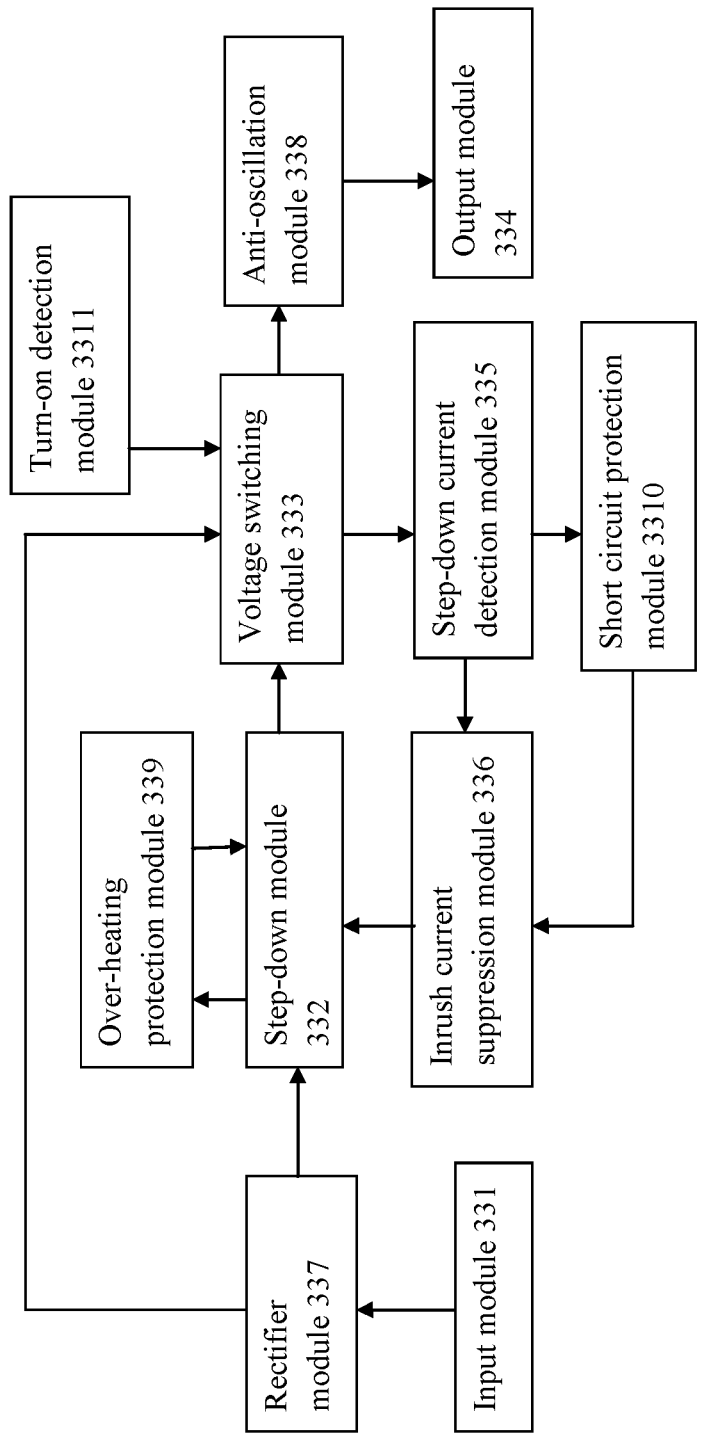
FIG. 7 is a block diagram of a circuit controller of the electromagnetic driving device of the electromagnetic valve according to the above mentioned second preferred embodiment of the present invention.
Figure 8:
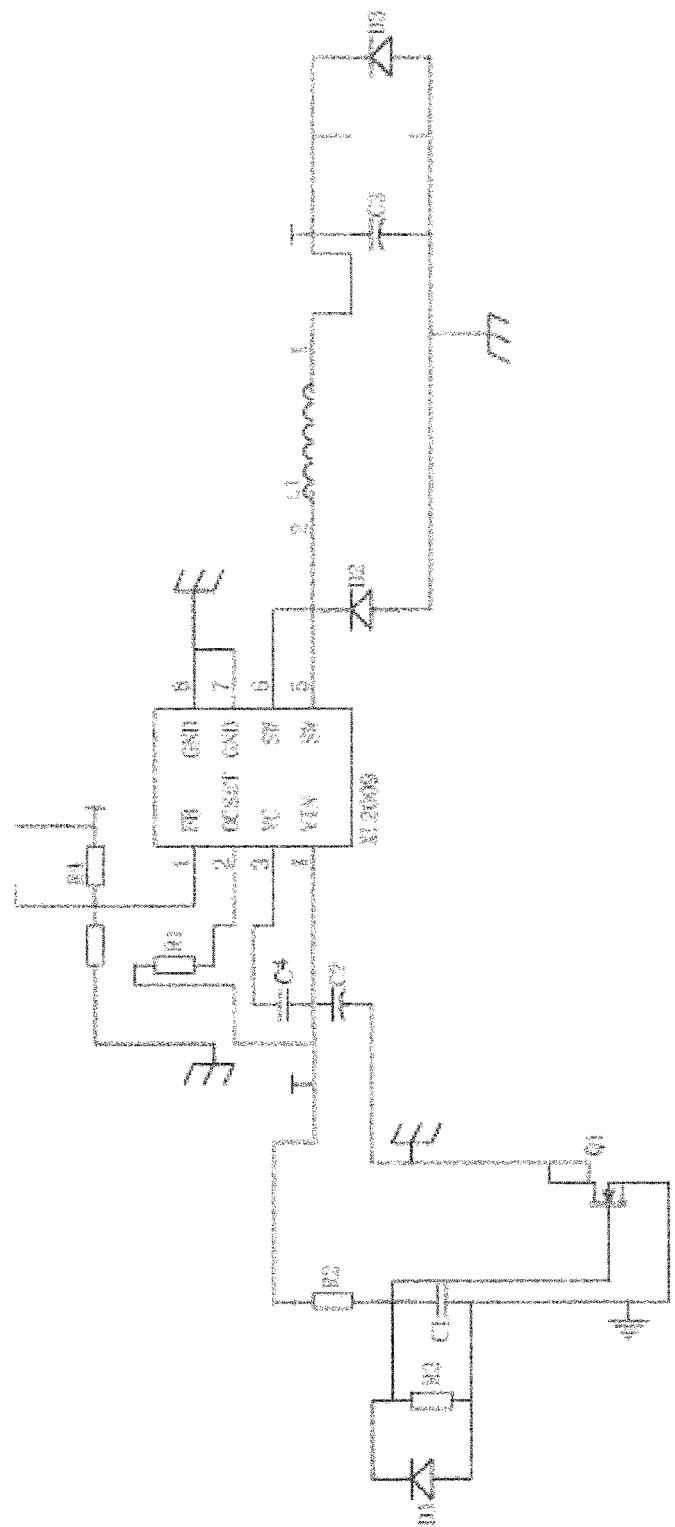
FIG. 8 is a circuit diagram of a circuit controller of the electromagnetic driving device of the electromagnetic valve integrating into a XL2009 chip, wherein the Xl2.09 chip is electrically connected to the peripheral circuit.

As shown in FIG. 7 and FIG. 8, the circuit controller 33 of the electromagnetic driving device 30 are electrically connected with the power source (external power) and the magnetic field generating unit 31, wherein the circuit controller 33 can be adapted to generate a turn-on current (turn-on voltage) to the magnetic field generating unit 31 of the electromagnetic driving device 30 while the electromagnetic valve is turned on. In addition, the circuit controller 33 can also generate a holding current to the magnetic field generating unit 31 of the electromagnetic driving device 30, wherein the magnetic field generating unit 31 of the electromagnetic driving device 30 is adapted to generate a driving force by the turn-on current to force the valve core 20 being moved, and the magnetic field generating unit 31 of the electromagnetic driving device 30 is adapted to generate a holding force by the holding current, so as to maintain the vale core 20 in the operating state, wherein the amount of the turn-on current is larger than that of the holding current. Therefore, the amount of the driving force is larger than that of the holding force. That is to say, the turn-on current is able to be generated from the circuit controller 33 to the magnetic field generating unit 31 of the electromagnetic driving device 30, so that the valve core 20 is activated by the electromagnetic valve in the operating state, and then the holding current is provided by the magnetic field generating unit 31 of the electromagnetic driving device 30, and the valve core 20 can be remained in the operating state. At the same time, the amount of the holding current is smaller than that of the turn-on current, and the electromagnetic valve can be operated in a less-power consuming situation.

It is worth mentioning that the circuit controller 33 of the electromagnetic valve 30 is electrically connected with a power source, and at the same time, the circuit controller 33 can be electrically connected to at least one magnetic field generating unit 31 of the electromagnetic driving device 30 of the electromagnetic valve, and the turn-on current and the holding current are provided from the electromagnetic valve. When the turn-on current passes through the electromagnetic coil 311 of the magnetic field generating field 31 of the electromagnetic driving device 30, a driving force is generated by the magnetic field generating unit 31 of the electromagnetic driving device 30 to force the passive member 32 of the electromagnetic driving device 30 in the operating state, and the passive member 32 can be directly or indirectly moved within the operation chamber 100. When the holding current passes through the electromagnetic coil 311 of the magnetic field generating unit 31 of the electromagnetic driving device 30 while the electromagnetic valve has been already turned on, the holding force is generated by the electromagnetic driving device 30 to maintain the passive member 32 in the operating state, so as to maintain the valve core 20 moving within the operation chamber 100 of the valve body 10 in the operating state.

Referring to FIG. 7 and FIG. 8 of the drawings, the circuit controller 33 of the electromagnetic driving device 30 comprises an input module 331, a step-down module 332, a voltage switching module 333 and an output module 334, wherein the input module 331 is electrically connected with the step-down module 332 and the voltage switching module 333 respectively, and the step-down module 332 is electrically connected with the voltage switching module 332 and the input module 331 respectively and the voltage switching module 333 is electrically connected with the input module 331, the step-down module 332, and the output module 334. The turn-on current can be provided by the voltage switching module 333 while the electromagnetic valve is turned on, and the holding current can be also provided by the voltage switching module 333 while a voltage switching signal is received by the voltage switching module 333.

It is worth mentioning that the input module 331 of the circuit controller 33 of the electromagnetic driving device 30 can be any device capable of receiving an operating command, such as S7-330 series input modules (Siemens Co., Ltd.), which is adapted for receiving, controlling and adjusting various parameters of the circuit controller 33, such as start/stop and so on. The step-down module 332 can be directly or indirectly, electrically connected to the input module 331. The step-down module 332 of the circuit controller 33 can be achieved for reducing voltage and a reduction voltage which can be used in the electromagnetic valve, such as an AC step-down module LH25-10B48 (MORNSUN Company) or DC step-down module VRB_LD-50 W (MORNSUN Company). The circuit controller 33 of the voltage switching module 333 can be implemented to switch the voltage to provide the holding current after a voltage switching signal is received by the voltage switching module 333 or after a preset time, such as a voltage switching module S7-330 series (produced by Siemens). The output module 334 of the circuit controller 33 can be any kind of output device which can provide a control signal after the output command is received by the output module 334, such as S7-330 series input modules (produced by Siemens). Preferably, the step-down module 332 can be directly or indirectly connected to the magnetic field generating unit 31 of the electromagnetic driving device 30 through the output module 334. In other words, the output module 334 can be directly or indirectly electrically connected with the electromagnetic coil 311 of the magnetic field generating unit 31 of the electromagnetic driving device 30. The switching signal can be accepted by any kinds of voltage switching module 333, and the voltage switching module 333 can be adapted to switch the voltage based on the voltage switching signal. According to the physical properties of the voltage switching signal, the voltage switching signal can be electrical signals, optical signals, acoustic signals, or other property signals. According to the properties of the voltage switching signal, the voltage switching signal may be a time signal, such as a time delay signal, an electromagnetic valve turn-on signal or other signals. The voltage switching signal comes from the circuit controller 33. For example, the voltage switching signal may be a time signal, and the time signal is generated by the voltage switching module 333 of the circuit controller 33, so that the turn-on current is provided by the voltage switching module 333 to the electromagnetic valve, and then to generate the time signal, after that the time signal is received by the voltage switching module to switch the voltage and provide the holding current. Preferably, the input module 331 and the output module 334 are integrated together to form an input-output modules, such as the input-output modules of S7-330 series (produced by Siemens), which is able to achieve input and output functions. In other words, the input-output module can be adapted to achieve functions of the input module 331 and the output module 334.

Alternatively, a turn-on module and a holding voltage lower than the turn-on voltage can be input or programmed to the voltage switching module 333, so that the turn-on voltage is provided by the voltage switching module, and after a preset time, the turn-on voltage is switched to the holding voltage by the voltage switching module 333. Preferably, the amount of the holding voltage is lower than that of the turn-on voltage. Therefore, a conventional delay circuit 555 and RC delay circuit or RC delay can be applied to the delayed circuit of the voltage switching module. The switching circuit 333 of the voltage switching module 333 consisted of multiple interlocked contactors or a switching circuit controlled by the control chip through the software algorithm. In other words, the voltage switching module 333 can be a programmed or computed control chip and control circuit.

Referring to FIG. 7 and FIG. 8 of the drawings, the circuit controller 30 of the electromagnetic driving device 33 comprises a current detection module 335 and an inrush current suppression module 336, wherein the current detection module 335 and the voltage switching module 333 are electrically connected. The current detection module 335 can be adapted to detect the amount of the current passed through the voltage switching module 333. In other words, the current flowed through the current detection module 335 is provided to the electromagnetic valve 33 through the output module 334, so that the amount of the turn-on current and the holding current passed through the electromagnetic valve by the circuit controller 33 can be detected by the current detection module 335. In some cases, the voltage input by the power source is instable and has large fluctuations, and the misuse of the operators, or other unforeseen circumstances may result that the amount of the holding current exceeded than that of the turn-on current, or the amount of the holding current is too small to maintain the operation of the electromagnetic valve. Then, the amount of the current passed through the voltage switching module 333 can be detected by the current detection module 335 and send the feedback to the step-down module 332, and the step-down module 332 is adapted to increase and reduce the voltage added to the voltage switching module 333. In other words, the step-down module 332 not only adjusts the voltage added to the circuit controller 33, but also adjusts the amount of the current passed through the voltage switching module 333. Preferably, the current detection module 335 and inrush current suppression module 336 are electrically connected, and the inrush current suppression module 336 is electrically connected with the voltage switching module 333. Under normal circumstances, when the control circuit or controller are powered on or started, a high current is instantly produced, and the inrush current suppression module 336 is able to limit or reduce the inrush current that may generate when the circuit controller 33 is turned on. The inrush current suppression module 336 can be achieved by a negative power supply temperature coefficient thermistor (NTC). The inrush current suppression module 336 may also be an inrush current suppression module FS-A01D (MORN-SUN Corporation).

It is worth mentioning that the current detection module 335 can be any kind of detection devices capable of detecting the current flowed through the current switching module 333, and then transmitting the detection results to the step-down module 332. In other words, any current detection device, which is able to detect the current passed through the voltage switching module 333, can be embodied as the current detection module 335 of the circuit controller 33 of the present invention. For example, the current detection module 335 can be a MAX1080 chip (MAXIM Corporation). Preferably, the current passed through the current switching module 333 can be detected by the detection module 335, and transmits the detection result to the step-down module 332 of the circuit controller 33.

Referring to FIG. 7 and FIG. 8 of the drawings, the circuit controller 33 of the electromagnetic driving device 30 further comprises a rectifier 337, wherein the rectifier 337 is provided between the input module 331, the step-down module 332, and the voltage switching module 333. In other words, the rectifier 337 is electrically connected with the input module 331, the step-down module 332, and the voltage switching module 333 respectively, wherein the voltage switching module 333 and the step-down module 332 are electrically connected to the input module 331 through the rectifier 337.

It is worth mentioning that the rectifier 337 can be any kinds of rectifier which has the same functions of the rectifier 337.

Referring to FIG. 7 and FIG. 8 of the drawings, the circuit controller of the electromagnetic driving device 30 further comprises an anti-oscillation module 338, wherein the anti-oscillation module 338 is electrically connected to the voltage switching module 333 and the output module 334 respectively. In other words, the anti-oscillation module 338 is arranged between the voltage switching module 333 and the output module, and is electrically connected with the voltage switching module 333 and the output module 334 respectively.

It is worth mentioning that the anti-oscillation of the circuit controller 33 can be adapted to eliminate any existing oscillations and for adjusting the amplitude of the output signal to prevent oscillations. The anti-oscillation module 338 according to the second embodiment of the present invention is a serially connected resistor and capacitor for eliminating high-frequency oscillations.

Referring to FIG. 7 and FIG. 8 of the drawings, the circuit controller 33 of the electromagnetic driving device 30 further comprises an over-heating protection module 339 and a short-circuit protection module 3310, wherein the over-heating protection module 339 and the step-down module 210 are two-way connected, and the short circuit protection module 339 is electrically connected to the current detection module 335 and the inrush current suppression module 336 respectively. The short circuit protection module 339 is capable of cut down the current provide to the circuit controller 33 in order to prevent the short circuit.

It is worth mentioning that the over-heating protection module 339 can be any kinds of devices which is capable of cutting down the current provided to the circuit controller 33 while the operation temperature of the step-down module 210 of the circuit controller 33 is too high.

Referring to FIG. 7 and FIG. 8 of the drawings, the circuit controller 33 of the electromagnetic driving device 30 further comprises a turn-on detection module 3311 adapted to detect the turn on situation of the electromagnetic module, wherein the turn-on detection module 3311 is electrically connected to the voltage switching module 333. The turn-on detection module 3311 is able to generate a voltage switching signal, and the voltage switching signal is sent to the voltage switching module 333 while the electromagnetic valve is detected to turn on by the turn-on detection module 3331.

It is worth mentioning that the turn-on detection module 3311 of the circuit controller 33 of the electromagnetic driving device 30 can be any kinds of devices which is capable of detecting the turn-on operation of the electromagnetic valve. For example, the turn-on detection module 3311 can be the detection devices which can detect the current passed through the electromagnetic valve coil current, or a sensor for detecting the movement of the electromagnetic valve, or even the aforementioned voltage switching module 333 which can generate the time signal in the turn-on situation.

Referring to FIG. 8 of the drawings, the circuit controller 33 of the electromagnetic driving device 30 of the electromagnetic valve can be integrated with other circuit control devices, wherein different functions of modules of the circuit controller can be integrated to form a high performance DC-DC converting chip, such as XL2009 chips. Of course, during the integration, the peripheral circuit of the XL2009 chip needs to be modified.

As shown in FIG. 8, the circuit controller 33 of the electromagnetic driving device 30 according to the second embodiment of the present invention further comprises a peripheral circuit adapted to integrate the circuit controller and other chips, such as XL2009 chip integration, wherein the peripheral circuit comprises an inductor L1, MOS tube Q1, a first capacitor C1, a second capacitor C2, a third capacitor C3, a fourth capacitor C4, a first diode D1, a second diode D2, a third diode D3, a first resistor R1, a second resistor R2, a third resistor R3, and a fourth resistors R4. One end of the inductor L1 is connected to a fifth port, a sixth port, and a reverse side of the second diode D2, and the other end of the inductor L1 is connected to a second end of the third capacitor C3 and a reverse end of the diode D3 respectively to provide a turn-on voltage and a holding voltage. A forward end of the diode D2 is connected to a second end of the third capacitor C3, and a forward end of the third diode D3 respectively. One end of the second capacitor C2 and the fourth capacitor are electrically connected to an external power source, wherein the external power source and the turn-on voltage can be electrically connected with a fourth port of the XL2009 chip. A second port of the capacitor C4 is electrically connected to a third port of the XL2009. One end of the second resistor R2 is electrically connected to a fourth port of the XL2009, and the other end of the second resistor R2 is electrically connected to a first port of the first capacitor C1, a first port of the third resistor R3, a reverse end of the first diode D1, and a grid electrode of the MOS tube Q1. A forward port of the first diode D1, a second port of the third resistor R3, a second port of the first capacitor C1, and a source electrode of the MOS tube Q1 are grounded. A drain electrode of the MOS tube Q1 is connected to a second port of the second capacitor C2. A second port of the XL2009 chip is connected with the external power (turn-on voltage) through the first resistor R1. The turn-on voltage and the holding voltage are outputted by the first port of the XL2009 chip through the fourth resistor R4. Preferably, the amount of the L1 inductor is 40-50 uH, the amount of the first capacitor C1 is 0.5_2 uF, the amount of the second capacitor C2 is 70_120 uF, the amount of the third capacitor C3 is 70-100 uF, the amount of the fourth capacitor C4 is 0.5-1 uF, the amount of the first resistor R1 is 15-16.5K ohms, the amount of the second resistor R2 is 40-50K ohms, the amount of the third resistor R3 is 19-19.5 ohms, and the amount of the fourth resistor R4 is 40-50K ohms.

Referring to FIG. 8 of the drawings, the inductor L1 and related peripheral circuits can form a buck current sensing circuit; the inrush current suppression circuit can be formed by MOS tube Q1 and related peripheral circuits, and the over-heating protection circuit, short circuit protection circuit, and anti-oscillation circuit can be formed by XL2009 internal modules and peripheral, capacitors and diodes.

According to the second embodiment of the present invention, the electromagnetic driving device 30 of the electromagnetic valve is illustrated, wherein the electromagnetic driving device 30 is electrically connected to the power source. The electromagnetic driving device not only provides a turn-on activation to the valve core of the electromagnetic valve while the electromagnetic valve is turned on, but also provides a holding activation to maintain the electromagnetic valve in the operating state. Furthermore, the electromagnetic driving devices 30 comprises a magnetic field generating unit 31, a passive member 32 and a circuit controller 33. A driving chamber 310 is formed by the magnetic field generating unit 31. The passive member 32 is arranged inside the circuit controller 33, wherein the circuit controller 33 is electrically connected to the magnetic field generating unit 31 and the power source respectively. A turn-on current is provided by the circuit controller 33 to the magnetic field generating unit 31 while the electromagnetic valve is turned on, so that the passive member 32 can be activated to move within the driving chamber 310 by the magnetic field generating unit 31, and then the electromagnetic valve is activated to process in the operating state. A holding current is able to be provided by the circuit controller 33 to the magnetic field generating unit 31, and the passive member 32 is maintained to move within in the driving chamber 310, and at the same time the valve core is maintained in the operating state, wherein the amount of the turn-on current is larger than that of the holding current.

Furthermore, the magnetic field generating unit 31 of the electromagnetic valve comprises an electromagnetic coil 311 and a magnetic sensor 312, wherein the electromagnetic coil 311 is wound around the magnetic sensor 312, and the driving chamber 310 is formed by the magnetic sensor 312. The electromagnetic coil 311 is electrically connected to the circuit controller 33, wherein the magnetic sensor 312 and the passive member 32 are made of soft and magnetic material. When the turn-on current is flowing in the electromagnetic coil 311, the vale core 20 can be activated to operate in the operating state by the electromagnetic driving device 30, and a holding current flows in the electromagnetic coil 311 to maintain the valve core 20 being operating in the operating state.

According to the second embodiment of the present invention, the circuit controller 33 of the electromagnetic driving device 30 is electrically connected with a power source, wherein when the electromagnetic valve is turned on, a turn-on current can be generated from the magnetic field generating unit. Then the electromagnetic valve is activated to process in the operating state. A holding current is able to be provided to the electromagnetic valve, and the passive member 32 is maintained in the operating state, wherein the amount of the turn-on current is larger than that of the holding current.

Furthermore, the circuit controller further comprises an input module 331, a step-down module 332, a voltage switching module 333 and an output module 334, wherein the input module 331 is electrically connected with the step-down module 332 and the voltage switching module 333 respectively. The step-down module 332 is electrically connected with the voltage switching module 333 and the input module 331 respectively. The voltage switching module 333 is electrically connected with the input module 331, the step-down module 332, and the output module 334, wherein the turn-on current can be provided by the voltage switching module 333 while the electromagnetic valve is turned on, and the holding current can be also provided by the voltage switching module 33 while a voltage switching signal is received by the voltage switching module 33.

Referring to FIG. 9 of the drawings, a method for providing electrical power to an electromagnetic valve according to a second preferred embodiment of the present invention, comprising the following steps.

(A) When the electromagnetic valve is turned on, a turn-on current is generated from an electromagnetic driving device 30 of the electromagnetic valve to a magnetic field generating unit.

(B) After receiving a voltage switching signal, a holding current is generated from an electromagnetic driving device 30 of the electromagnetic valve to a magnetic field generating unit, wherein an amount of the turn-on current is larger than that of the holding current.

Preferably, when the turn-on current is passed through a control coil of the electromagnetic valve, a magnetic force is generated by the electromagnetic driving drive of the electromagnetic valve to drive a movement of the electromagnetic valve.

It is worth mentioning that the magnetic force not only can be directly applied on a valve core of the electromagnetic valve, but also can be indirectly applied on the valve core through other electromagnetic vale members.

According to the second embodiment of the present invention, the method for providing the electrical power to the electromagnetic vale further comprises the following step.

(C) Detect the holding current provided to the circuit controller of the electromagnetic driving device, and the amount of the holding current is compared with a preset current valve. If the amount of the holding current matches with that of the preset current, the amount of the holding current is remained the same. If the amount of the holding current is different from that of the preset current, the circuit controller of the electromagnetic driving device 30 is able to adjust the amount of the holding current until the amount of the holding current matches with that of the preset current. Preferably, the step (C) is preformed after the step (B).

It is worth mentioning that the voltage switching signal may be generated in the circuit controller itself, or is detected from the electromagnetic vale via a separate device or structure, is transmitted to the circuit controller, and is received by the circuit control. In some embodiments, the voltage switching signal is self-generated and received by the circuit controller. For example, the voltage switching signal is generated from the voltage switching module of the circuit controller, wherein the turn-on current (voltage) is provided from the voltage switching module to the electromagnetic valve after the electromagnetic is turned on, and the holding current is generated from the voltage switching module to the electromagnetic vale after a preset time. In other embodiments, the voltage switching signal can be provided from any device electrically connected with the circuit controller. For example, the voltage switching signal can be provided by a detector, wherein the detector can detect the start of the electromagnetic valve, a generation of the voltage switching signal and send the voltage switching signal to the circuit controller. Further, the method of supplying electrical power to the electromagnetic valve comprises the following step.

(A1) Adjust the voltage provided to the electromagnetic valve based on the preset voltage in order to improve the stability of the voltage, wherein the step (A1) is performed before the step (A).

Figure 10A:
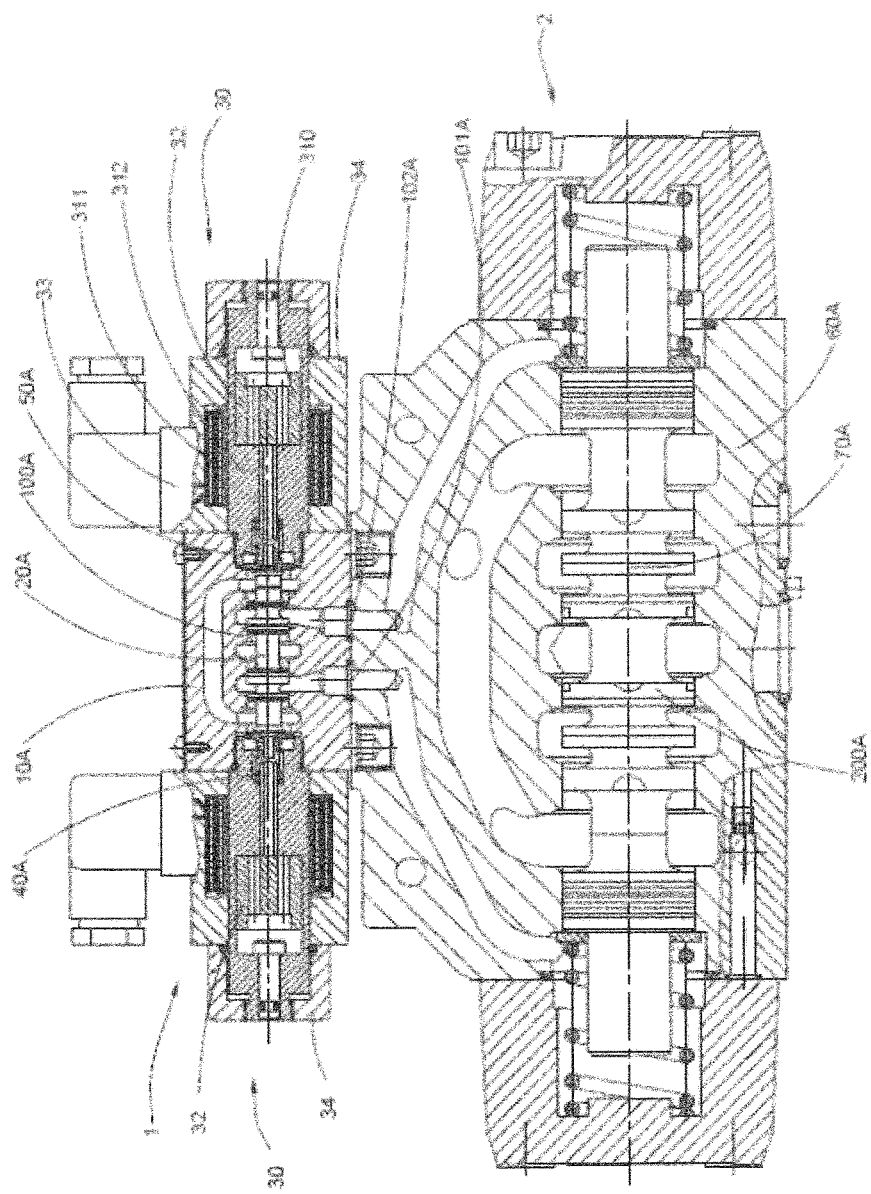
FIG. 10A is a sectional view of an electromagnetic valve according to a third preferred embodiment of the present invention.
Figure 10B:
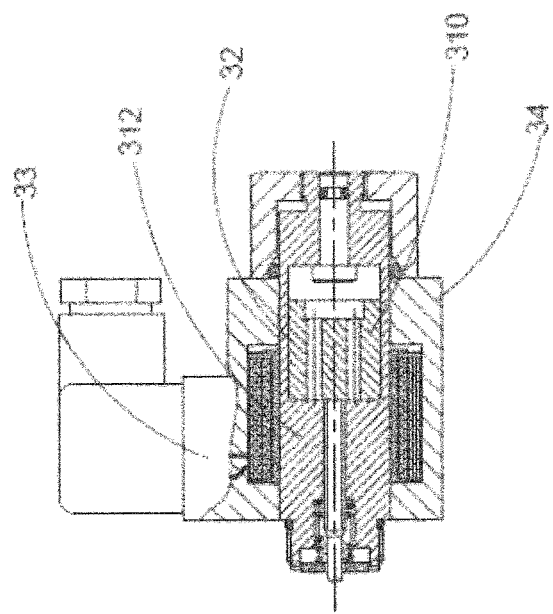
FIG. 10B is sectional view of the electromagnetic view according to the third preferred embodiment of the present invention, illustrating the electromagnetic driving device of the electromagnetic valve.

Referring to FIG. 10A and FIG. 10B of the drawings, an electromagnetic valve according to a third preferred embodiment of the present invention is illustrated, wherein the electromagnetic valve comprises a pilot valve 1 and a main valve 2, wherein the pilot valve 1 is physically connected with the main valve 2 to control an operation of the main valve 2.

Referring to FIG. 10A and FIG. 10B of the drawings, wherein the electromagnetic valve comprises a pilot valve body 10A, a pilot valve core 20A and at least one electromagnetic driving device 30, wherein the pilot valve body 10A is formed with an operation chamber 100A. The pilot valve core 20A can be movably disposed within the operation chamber 100A of the pilot valve body 10A, and the electromagnetic driving devices 30 are disposed in the operation chamber 100A of the pilot valve body 10A is within the operation chamber 100A, wherein each of the electromagnetic driving devices 30 comprises a magnetic field generating unit 31, a passive member 32 and a circuit controller 33, wherein a driving chamber 310 is formed by the magnetic field generating unit 31 is formed a drive chamber 310. The driving chamber 310 is communicated with the operation chamber 100A, and the passive member 32 can be movably disposed within the driving chamber 310. The passive driven member 32 and the pilot valve core 20A are physically connected, so that the appropriate current can be generated by the magnetic field generating unit 31 of the electromagnetic driving devices 30. The pilot valve core 20A can be activated to be moved inside the operation chamber 100A by the passive member 32 which is activated by the electromagnetic driving device 30, so that the pilot valve core 20A is in an operating state.

Referring to FIG. 10A and FIG. 10B of the drawings, the main valve 2 comprises a main valve body 60A, and a main valve core 70A movably disposed within the main valve body 60A, wherein the main valve body 60A is formed with an operation chamber 200A. The main valve core 70A can be movably disposed within the operation chamber 200A, wherein while the pilot valve core 20A is activated by the pilot valve body 1. The pilot valve core 20A is communicated with at least one guiding inlet 101A of the pilot valve body 10A of the pilot valve 1, and a hydraulic (or pneumatic) is provided or stopped to provide to the main valve 2, so that the main core 70A of the main valve 2 is in a reciprocating motion inside the main valve body 60A.

Preferably, the circuit controller 33 of the electromagnetic driving device 30 is electrically connected with the magnetic field generating unit 31 and a power source respectively. When the electromagnetic valve is turned on, a turn-on current can be generated from the magnetic field generating unit 31 to force the passive member 32 moving inside the driving chamber 310, and then the pilot valve core 20A can be activated in the operating state. A remaining current generated by the circuit controller 33 is provided to the magnetic field generating unit 31 after the electromagnetic valve is turned on, so the passive member 32 can be maintained for moving inside the driving chamber 310. That is to say, the electromagnetic driving devices are electrically connected to the power source, wherein the pilot valve core 20A can be activated in the operating state by the electromagnetic driving device 30 while the electromagnetic valve is turned on. After that, the pilot valve core 20A also can be retained in the operating state by the electromagnetic driving device 30.

It is worth mentioning that a turn-on current, such as 24V, is generated from the circuit controller 33 to the electromagnetic driving device 30 while the electromagnetic valve is turned on, and then the passive member 32 is activated for moving inside the driving chamber 310. Then the pilot valve core 20A can be activated in the operating state. A remaining current, such as 8V, is generated by the circuit controller 33 and is provided to the magnetic field generating unit 31 to maintain the operating state of the electromagnetic valve, Accordingly, the electromagnetic valve of the present invention can be remained under a normally operating state with less-power consuming.

Preferably, the passive member 32 is made of magnetic and rigid material, and after the appropriate current is provided to the electromagnetic driving device 30 is provided after an appropriate current, a magnetic field is generated by the magnetic field generating unit 31, wherein the magnetic field is passed through the driving chamber 310, and the passive member 32 can be activate to be moving inside the driving chamber 310 by the magnetic field.

It is worth mentioning that the passive member 32 not only can be made of rigid and magnetic material, but also can be made of soft and magnetic material. The soft and magnetic material of the present invention has a coercive force which is not greater than 1000 A/m. Preferably, the passive member 32 is made of soft iron, silicon or silicon steel and other soft and magnetic materials. The passive member 32 also can may be replaced to other soft and magnetic material, such as carbonyl iron material.

Preferably, the driving chamber 310 is formed at the pilot valve body 10A, wherein after the appropriate current is provided to the electromagnetic driving device 30, a magnetic field is generated by the magnetic field generating unit 31. The magnetic field passes through the driving chamber 310, and the passive member 32 can be activate to move inside the driving chamber 310 by the magnetic field.

Preferably, the driving chamber 310 is arranged inside the pilot valve body 10A of the electromagnetic valve to from the operation chamber 100A.

As shown in FIG. 10A and FIG. 10B, the magnetic field generating unit 31 of the electromagnetic valve comprises an electromagnetic coil 311 and a magnetic sensor 312, wherein the electromagnetic coil 311 is wound around the magnetic sensor 312, and the magnetic sensor 312 is in the driving chamber 310. The electromagnetic coil 311 and the circuit controller 33 are electrically connected, wherein the magnetic sensor 312 and the passive member 32 are made of soft magnetic materials. When the turn-on current is flowing in the electromagnetic coil 311, the pilot vale core 20A can be activated to operate in the operating state by the electromagnetic driving device 30, and a holding current flows in the electromagnetic coil 311 to maintain the pilot valve core 20A being operating in the operating state. In other words, when the turn-on current is provided by the circuit controller 33 of the electromagnetic driving device 30 to the electromagnetic coil 311 of the electromagnetic field generating unit 311, a magnetic field generated by the magnetic field generating unit 31 of the electromagnetic driving device 30 can pass through the driving chamber 310. Then the passive member 32 can be activated to move in the driving chamber 310 by the magnetic field, wherein the valve core can be activated for moving by the passive member. When a holding current is provided by the circuit controller of the electromagnetic driving device 30 to the electromagnetic coil 311, a magnetic field is generated by the magnetic field generating unit 31 of the electromagnetic driving device 30 can pass through the driving chamber 310. The passive member 32 can be maintained in the operating state, and the pilot valve core 20A can be maintained in the operating state. It is worth mentioning that since the passive member 32 is made of a soft and magnetic material, a magnetic field passing through the driving chamber 310 can be generated by the magnetic field generating unit 31 while the turn-on current and the holding current is provided on the magnetic field generating unit 31. The turn-on current or the holding current can be generated through the drive chamber 310 of the magnetic field, thus preferably, the passive member 32 can be moved by an electromagnetic force.

It is worth mentioning that the magnetic sensor 312 not only can be made of rigid and magnetic material, but also can be made of soft and magnetic material. The soft and magnetic material of the present invention has a coercive force which is not greater than 1000 A/m. Preferably, the magnetic sensor 312 is made of soft iron, silicon or silicon steel and other soft and magnetic materials. The magnetic sensor 312 also can may be replaced to other soft and magnetic material, such as carbonyl iron material.

It is worth mentioning that the power source can be a turn-on power or a holding power, and also can be a power higher than the turn-on power. Those skilled in the art can be selected according to the appropriate power source. The amount of the power source is preferably 110V, 220V or 380V. Therefore, the circuit controller 33 of the electromagnetic driving device 30 of the present invention further comprises a transformer to convert the external power supply into the turn-on voltage or the holding voltage.

Preferably, the electromagnetic valve of the present invention can be a direct-acting electromagnetic valve, a pilot electromagnetic valve and a step and direct-acting electromagnetic valve.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A circuit controller for use in an electromagnetic valve which comprises:
   a valve core, an input module, a step-down module, a voltage switching module, an output module, a current detection module, and an inrush current suppression module;
   wherein said valve core is arranged for electrically connecting with a power source, wherein said circuit controller generates a turn-on current for driving the valve core in an operating state when said electromagnetic valve is turned on, and generates a holding current for maintaining the valve core in the operating state after said electromagnetic valve is turned on, wherein an amount of said turn-on current is lamer than that of said holding current;
   wherein said input module is electrically connected with said step-down module and said voltage switching module respectively, wherein said step-down module is electrically connected with said voltage switching module and said input module respectively, wherein said voltage switching module is electrically connected with said input module, said step-down module, said the output module, wherein the turn-on current is provided by said voltage switching module when said electromagnetic valve is turned on, and the holding current is also provided by said voltage switching module while a voltage switching signal is received by said voltage switching module;
   wherein said current detection module is electrically connected to said voltage switching module, wherein said current detection module detects an amount of current passed through said voltage switching module, and then transmits detection results to said step-down module, wherein said step-down module adjusts the amount of the current passed through said voltage switching module based on the detection results.

2. The circuit controller, as recited in claim 1, further comprising:
   a rectifier electrically connected with said input module, said step-down module, and said voltage switching module respectively, wherein said voltage switching module and said step-down module are electrically connected to said input module through said rectifier;

an anti-oscillation module electrically connected to said voltage switching module and said output module, wherein said voltage switching module is electrically connected with said output module through said anti-oscillation module;

an over-heating protection module and a short-circuit protection module, wherein said over-heating protection module and said step-down module are two-way connected, and said short circuit protection module is electrically connected to said current detection module and said inrush current suppression module respectively; and a turn-on detection module detecting a turn on situation of said electromagnetic valve, wherein said turn-on detection module is electrically connected to said voltage switching module, wherein said turn-on detection module generates a voltage switching signal that said voltage switching signal is sent to said voltage switching module while said electromagnetic valve is turned on.

3. The circuit controller, as recited in claim 2, wherein said voltage switching signal is generated and received by said voltage switching module after a preset time, so that said holding current is provided from said voltage switching module after the preset time.

4. A circuit controller for use in an electromagnetic valve which comprises a valve core, which is arranged for electrically connecting with a power source, wherein said circuit controller generates a turn-on current for driving the valve core in an operating state when said electromagnetic valve is turned on, and generates a holding current for maintaining the valve core in the operating state after said electromagnetic valve is turned on, wherein an amount of said turn-on current is larger than that of said holding current, wherein said circuit controller further comprises a peripheral circuit, wherein said peripheral circuit comprises an inductor, MOS tube, a first capacitor, a second capacitor, a third capacitor, a fourth capacitor, a first diode, a second diode, a third diode, a first resistor, a second resistor, a third resistor, and a fourth resistors, wherein one end of said inductor is connected to a reverse side of said second diode, and another end of said inductor is connected to a second end of said third capacitor and a reverse end of said third diode respectively, wherein a forward end of said second diode is connected to a second end of said third capacitor and a forward end of said third diode, wherein ends of said second capacitor and said fourth capacitor are electrically connected to an external power source, wherein one end of said second resistor is electrically connected to an assembly chip, and another end of said second resistor is electrically connected to a first port of said first capacitor, a first port of said third resistor, a reverse end of said first diode, and a grid electrode of said MOS tube, wherein a forward port of said first diode, a second port of said third resistor, a second port of said first capacitor, and a source electrode of said MOS tube are grounded, wherein a drain electrode of said MOS tube is connected to a second port of said second capacitor.

5. The circuit controller, as recited in claim 4, wherein a value of said inductor is 40-50 uH, a value of said first capacitor is 0.5-2 uF, a value of said second capacitor is 70-120 uF, a value of said third capacitor is 70-100 uF, a value of said fourth capacitor is 0.5-1uF, a value of said first resistor is 15-16.5K ohms, a value of said second resistor is 40-50K ohms, a value of said third resistor is 19-19.5 ohms, and a value of said fourth resistor is 40-50K ohms.

* * * * *